US008461782B2

(12) United States Patent
Ward et al.

(10) Patent No.: US 8,461,782 B2
(45) Date of Patent: Jun. 11, 2013

(54) LINEAR OR ROTATIONAL MOTOR DRIVER IDENTIFICATION

(75) Inventors: Michael G. Ward, Wells, ME (US); David J. Haas, Weare, NH (US); William P. Taylor, Amherst, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 518 days.

(21) Appl. No.: 12/548,815

(22) Filed: Aug. 27, 2009

(65) Prior Publication Data

US 2011/0055442 A1  Mar. 3, 2011

(51) Int. Cl.
*H02P 5/00* (2006.01)
(52) U.S. Cl.
USPC .............. 318/5; 318/40; 318/43; 318/400.22; 700/230
(58) Field of Classification Search
USPC ................. 318/5, 40, 43, 115, 135, 432, 434, 318/632, 696, 400.22; 700/2, 3, 19, 20, 230; 710/4, 110, 243
See application file for complete search history.

(56) References Cited

U.S. PATENT DOCUMENTS

| 3,074,636 | A | * | 1/1963 | Baker et al. ................... 712/221 |
|---|---|---|---|---|
| 5,361,260 | A | | 11/1994 | Mito |
| 5,574,849 | A | | 11/1996 | Sonnier et al. |
| 5,606,717 | A | | 2/1997 | Farmwald et al. |
| 5,646,609 | A | | 7/1997 | O'Brien |
| 5,675,811 | A | | 10/1997 | Broedner et al. |
| 5,689,689 | A | | 11/1997 | Meyers et al. |
| 6,426,916 | B2 | | 7/2002 | Farmwald et al. |
| 6,522,944 | B2 | * | 2/2003 | Wielebski et al. ............. 700/224 |
| 6,563,419 | B1 | | 5/2003 | Herz et al. |
| 6,618,628 | B1 | * | 9/2003 | Davlin et al. ..................... 700/3 |
| 6,701,214 | B1 | * | 3/2004 | Wielebski et al. ............. 700/224 |
| 6,715,020 | B2 | | 3/2004 | Farmwald et al. |
| 6,728,819 | B2 | | 4/2004 | Farmwald et al. |
| 6,751,696 | B2 | | 6/2004 | Farmwald et al. |
| 6,825,625 | B1 | * | 11/2004 | Karwath et al. .............. 318/434 |
| 6,952,618 | B2 | * | 10/2005 | Davlin et al. ..................... 700/3 |

(Continued)

FOREIGN PATENT DOCUMENTS

| DE | 101 47 512 | 4/2003 |
|---|---|---|
| FR | 2885710 A1 | 11/2006 |
| GB | 2 353 448 | 2/2001 |

OTHER PUBLICATIONS

International Search Report and the Written Opinion of the International Searching Authority for PCT/US2010/045403, date of mailing Oct. 18, 2010, 14 pages.

(Continued)

*Primary Examiner* — Paul Ip
(74) *Attorney, Agent, or Firm* — Daly, Crowley, Mofford & Durkee, LLP

(57) ABSTRACT

A mechanism for assigning unique addresses to identical devices attached to a serial bus is presented. Each device has at least one output and is provided with a storage device to provide a configurable portion of a bus address having a fixed portion and a configurable portion. The device is further provided with circuitry, coupled to the storage device and the output, to determine a state of the output and use the state to configure the configurable portion. Once the configurable portion is configured, the bus address uniquely identifies the device. Such configuration allows more than one such device to be coupled to the same serial bus, e.g., an I²C bus.

24 Claims, 10 Drawing Sheets

U.S. PATENT DOCUMENTS

| | | | |
|---|---|---|---|
| 6,975,558 | B2 | 12/2005 | Farmwald et al. |
| 7,038,412 | B2 * | 5/2006 | Karwath et al. ......... 318/400.22 |
| 7,110,322 | B2 | 9/2006 | Farmwald et al. |
| 7,158,900 | B2 * | 1/2007 | McNutt ........................... 702/73 |
| 7,191,269 | B2 | 3/2007 | Cluff |
| 7,207,014 | B2 | 4/2007 | Velasco et al. |
| 7,209,997 | B2 | 4/2007 | Farmwald et al. |
| 7,254,452 | B2 * | 8/2007 | Davlin et al. ...................... 700/3 |
| 7,366,115 | B2 * | 4/2008 | Vandensande ................ 370/257 |
| 7,558,646 | B2 * | 7/2009 | Matsumoto et al. .......... 700/249 |
| 7,668,674 | B2 * | 2/2010 | McNutt ........................... 702/79 |
| 7,774,074 | B2 * | 8/2010 | Davlin et al. ...................... 700/3 |
| 7,990,983 | B2 * | 8/2011 | Denham ........................ 370/401 |
| 7,996,104 | B2 * | 8/2011 | Wielebski et al. ............ 700/230 |
| 8,122,159 | B2 | 2/2012 | Monreal |
| 2001/0011892 | A1 | 8/2001 | Ropke |
| 2002/0010527 | A1 * | 1/2002 | Wielebski et al. ............ 700/230 |
| 2003/0220702 | A1 * | 11/2003 | McNutt ............................ 700/6 |
| 2004/0039456 | A1 * | 2/2004 | Davlin et al. ...................... 700/3 |
| 2004/0078097 | A1 | 4/2004 | Bruzy et al. |
| 2004/0117537 | A1 * | 6/2004 | Marcel Vandensande .... 710/305 |
| 2005/0035733 | A1 * | 2/2005 | Karwath et al. ............... 318/434 |
| 2005/0055132 | A1 * | 3/2005 | Matsumoto et al. .......... 700/245 |
| 2005/0128100 | A1 | 6/2005 | Petrocy |
| 2005/0128830 | A1 * | 6/2005 | Nishihara et al. ............. 365/200 |
| 2005/0132109 | A1 | 6/2005 | Steger |
| 2005/0228914 | A1 * | 10/2005 | Ishida ........................... 710/110 |
| 2005/0267701 | A1 * | 12/2005 | McNutt ........................... 702/73 |
| 2005/0273287 | A1 * | 12/2005 | McNutt ........................... 702/73 |
| 2006/0030951 | A1 * | 2/2006 | Davlin et al. ...................... 700/3 |
| 2006/0041630 | A1 * | 2/2006 | Naismith ....................... 709/208 |
| 2006/0221984 | A1 * | 10/2006 | Denham ........................ 370/401 |
| 2006/0224776 | A1 | 10/2006 | Vanderhenst |
| 2006/0282592 | A1 | 12/2006 | Zakriti |
| 2007/0094459 | A1 * | 4/2007 | Suzuki et al. ................. 711/156 |
| 2007/0198139 | A1 | 8/2007 | Boran et al. |
| 2007/0236164 | A1 * | 10/2007 | Xia et al. ...................... 318/632 |
| 2007/0236825 | A1 * | 10/2007 | Xia et al. ................... 360/78.04 |
| 2008/0061725 | A1 * | 3/2008 | Wu et al. ....................... 318/696 |
| 2008/0098144 | A1 * | 4/2008 | Rees et al. .................... 710/243 |
| 2008/0115512 | A1 * | 5/2008 | Rizzo ............................... 62/134 |
| 2008/0177397 | A1 * | 7/2008 | Davlin et al. ...................... 700/3 |
| 2008/0189459 | A1 * | 8/2008 | Takeuchi ...................... 710/110 |
| 2008/0288662 | A1 * | 11/2008 | Doorenbos ....................... 710/4 |
| 2010/0211190 | A1 * | 8/2010 | Akita ................................. 700/3 |
| 2012/0131231 | A1 | 5/2012 | Monreal |

OTHER PUBLICATIONS

Office Action (with English Translation) dated Oct. 16, 2012, for German Appl. No. 11 2009 004 394.1, filed Jul. 7, 2011, 15 pages.

Freescale Semiconductor, Advance Information "Two-Channel Distributed System Interface (DSI) Physical Interface Device", Document No. MC33790, Rev 11.0, Mar. 2008, 12 pages.

Freescale Semiconductor,Inc., "Distributed System Interface (DSI) Sensor Interface", Document No. MC33793/D, Motorola, Semiconductor Technical Data, Rev 10, Jul. 2003, 24 pages.

International Search Report (Form PCT/ISA/210) and Written Opinion of the International Searching Authority (Form PCT/ISA/237) for PCT/US2009/066068, dated Mar. 4, 2010, 11 pages.

AN1816, Using the HC912B32 to Implement the Distributed Systems Interface (DSI) Protocol; by Tracy McHenry, Motorola, Freescale Semiconductor, Inc., Aug. 1999, 24 pages.

DSI Bus Standard, Version 2.02, TRW Automotive, Launched by Motorola, Freescale Semiconductor, Mar. 29, 2005, 18 pages.

Notification Concerning Transmittal of International Preliminary Report on Patentability (Chapter 1 of the Patent Cooperation Treaty), PCT/US2009/066068, date of mailing Jul. 28, 2011, 2 pages.

Written Opinion of the International Searching Authority, PCT/US2009/066068, date of mailing Jul. 28, 2011, 4 pages.

Notification of Transmittal of International Preliminary Report on Patentability (Form PCT/IB/326) for PCT/US2010/045403 dated Mar. 8, 2012, 11 pages.

U.S. Issued Pat. No. 8,122,159; 150 pages Part 1 of 4.
U.S. Issued Pat. No. 8,122,159; 150 pages Part 2 of 4.
U.S. Issued Pat. No. 8,122,159; 119 pages Part 3 of 4.
U.S. Issued Pat. No. 8,122,159; file from Dec. 20, 2012 through Jan. 21, 2013, 8 pages, Part 4 of 4.
U.S. Appl. No. 13/344,959, filed through Jan. 21, 2013, 486 pages, Part 1 of 2.
U.S. Appl. No. 13/344,959, filed through Jan. 21, 2013, 476 pages, Part 2 of 2.

* cited by examiner

LINEAR OR ROTATIONAL MOTOR DRIVER IDENTIFICATION

CROSS-REFERENCE TO RELATED APPLICATIONS

Not applicable.

STATEMENT REGARDING FEDERALLY SPONSORED RESEARCH

Not applicable.

FIELD OF THE INVENTION

This invention relates generally to serial bus addressing techniques.

BACKGROUND OF THE INVENTION

Some serial bus protocols require that each device attached to the bus be identified by a unique address. The industry-standard Inter-Integrated Circuit ("I²C") bus is an example of such a bus. Devices on the I²C bus can be operated as either a master device or a slave device. A master device generates the clock signal and controls data transfers between master and slave devices. A master device addresses a slave device by transferring over the bus a number of bits (typically a byte) of information that includes an n-bit slave device bus address and a direction bit to indicate a read or write operation. The bus address of a particular slave device is often determined when the device is manufactured. That is, the bits of the slave device bus address are fixed (or "hard-wired") in the slave device. If two or more identical slave devices that share the same address are connected to the bus, the slave devices cannot be accessed individually by the master device. Therefore, each slave device coupled to the bus is required to have its own unique bus address for proper bus operation.

One mechanism for assigning unique addresses allows bits to be set by the user through the use of DIP switches or jumper block connectors. Another way to differentiate between identical slave devices on a serial bus is to use a chip select or enable, which requires the allocation of at least one extra pin on the slave device and therefore increases the cost and complexity of that device. The user (e.g., a module or system designer) could also employ a multiplexer to select multiple devices with the same bus address, a solution that would add to the overall cost and board space requirements of the system.

SUMMARY OF THE INVENTION

In general, in one aspect, the invention is directed to a device. The device includes a storage device to provide a configurable portion of a bus address for the device. The device further includes an output and circuitry coupled to the storage device and the output, to determine a state of the output and use the state to configure the configurable portion as a unique sub-address for the device when the device is coupled to a serial bus along with at least one other such device.

Embodiments of the invention may include one or more of the following features. The circuitry can include control circuitry and a comparator circuit coupled between the control circuitry and the output. The comparator circuit has a comparator circuit output to provide the state at a first logic level when the output is connected to an external pull-up resistor and at a second logic level when the output is not connected to an external pull-up resistor. The control circuitry determines the state from the comparator circuit output and uses the state to configure the configurable portion.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
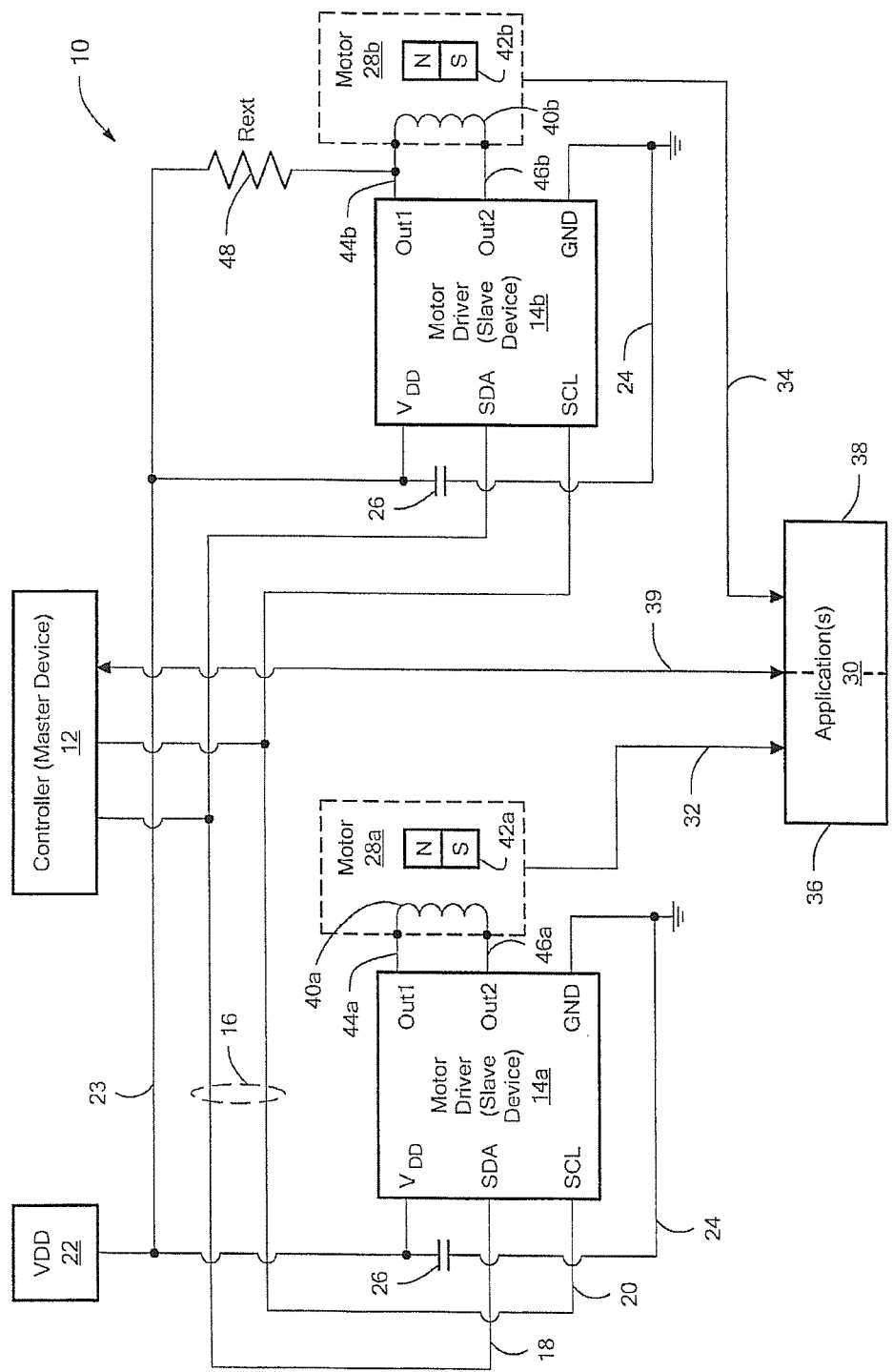
FIG. 1 is a block diagram of a system that includes a master device and two identical slave devices (shown has motor driver devices) coupled to a serial bus.

Referring to FIG. 1, a system 10 includes a master device (or "master") 12 and two identical slave devices 14a, 14b coupled to a serial bus 16. The serial bus 16 is shown as an Inter-Integrated Circuit ("I²C") bus. The I²C bus protocol is a synchronous serial bus protocol that uses a bi-directional data line and supports multiple slave devices controlled by an I²C bus master. An I²C bus consists of two wires, including a clock wire (or line) that is called "SCL" (and carries a clock signal generated by the master) and a data wire (or line) called "SDA". Thus, the serial bus 16 is implemented to include a data line 18 as an I²C bus SDA data line and a clock line 20 as an I²C bus SCL clock line. The master device 12 and slave devices 14a, 14b are designed to operate according to the I²C bus protocol. Each slave device has an n-bit bus address by which it is addressed by the master device 12. The number of bus address bits "n" may be seven (n=7), as will be described later with reference to FIG. 3, for example, or some other number of bits appropriate for a given design.

The slave devices 14a, 14b are also coupled to a supply voltage VDD 22 through a VDD line 23 and to a system ground through a ground connection 24. A bypass capacitor 26 is provided between each slave device's external VDD and ground connections. Alternatively, the bypass capacitor 26 could be eliminated in favor of an internal decoupling capacitor in each slave device. The internal decoupling capacitor could be, for example, the type of structure described in U.S. patent application Ser. No. 11/279,780, entitled "Methods and Apparatus for Sensor Having Capacitor On Chip," filed Apr. 14, 2006 with inventor William P. Taylor, now U.S. Pat. No. 7,573,112, issued Aug. 11, 2009, and assigned to Allegro Microsystems, Inc., the assignee of the subject application.

In one exemplary embodiment, as shown, the slave devices are motor drivers used to drive respective external motors (or actuators) 28a, 28b, e.g., linear motors such as voice coil motors (VCMs). The motor 28a and the motor 28b control movement of a structure or object in an application 30, as indicated by lines 32 and 34, respectively. The application 30 may be a single application or may be two applications each dedicated to performing a different function or activity, e.g., application 36 and application 38 (as indicated by the partitioning by the dashed lines), with each application controlled by a different one of the slave devices and motors. The master device 12, which may be a controller (e.g., a microcontroller) or processor, is also coupled to the application 30 via a separate control line or bus 39. Although not shown as such, the application, or more specifically, one or more components of the application, such as a specialty processor, e.g., a signal processor, and/or memory, could also be implemented as a slave device. If so implemented, that application slave device would be coupled to the master device 12 via bus 16 (with connections to the data line 18 and clock line 20) instead of bus 39.

In the illustrated example, the motor 28a is implemented with a coil 40a and a permanent magnet 42a (shown as a bar magnet) and the motor 28b is implemented with a coil 40b and permanent magnet 42b. Coil 40a is connected to device 14a across output lines 44a and 46a. Coil 40b is connected to device 14b across its respective output lines, output lines 44b, 46b.

An output of one of the devices 14a, 14b, e.g., device 14b, as shown, is coupled to VDD via an external component 48. In the illustrated system, the component is shown as a pull-up resistor "Rext" 48. At one end, the resistor 48 is connected to the VDD line 23. At an opposite end the resistor 48 is connected to the output line 44b of the device 14b. The presence or absence of such a resistor (which may be provided by one or more resistors, although it is only shown as a single resistor 48) at the output of each device 14a, 14b is used to determine a unique device identifier so that each device may be individually accessed by the master device 12, as will be described in further detail later.

Omitted from FIG. 1 (for purposes of simplification) are the pull-up resistors required on both the I²C bus clock and data lines. Also omitted are the supply and ground connections for the master device 12 and application 30.

Figure 2:
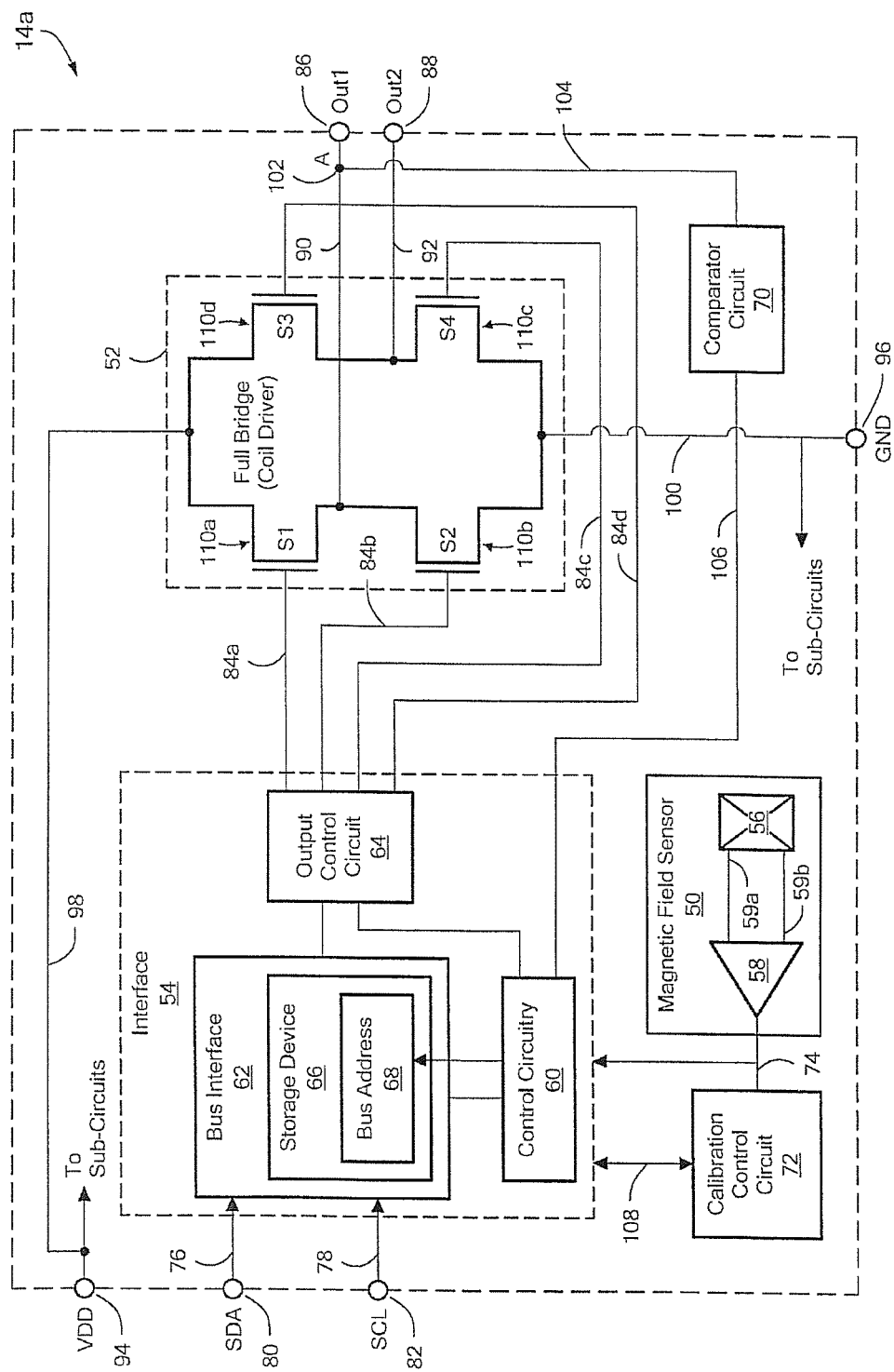
FIG. 2 is a block diagram of the motor driver slave device (from FIG. 1) that includes device identifier support, in the form of control and comparator circuitry, for determining a unique bus address for the motor driver according to an exemplary embodiment.

Referring to FIG. 2, the motor driver 14a (or 14b) includes a motion sensor shown as a magnetic field sensor 50, a coil driver 52 (shown here as a full or H-bridge driver) and a various control circuits indicated collectively as interface 54. The magnetic field sensor 50 includes a sensing device 56, for example, a Hall-effect element or some kind of magneto-resistive (MR) element and an amplifier 58 coupled to the sensing device by sensing device output lines 59a, 59b. The control circuits of the interface 54 include control circuitry 60 as well as a bus interface 62 and an output control circuit 64. The bus interface 62 includes a storage device 66 to store a bus address 68 associated with the device 14a. The storage device 66 may be any suitable type of storage device, e.g., a register or memory device like an E²PROM. The control circuitry 60 includes circuits to support various control functions, including bus address configuration, as will be described later with reference to FIGS. 6A-6C. Also included in the motor driver 14a is a comparator circuit 70. Optionally, the device 14a may also include a calibration control circuit 72 that allows the device 14a to calibrate itself.

Still referring to FIG. 2, the portion of the device 14a shown as interface 54 serves to interface the coil driver 52 to the controller 12 (from FIG. 1) as well as to couple the magnetic field sensor 50 to the coil driver 52. The interface 54 receives the output of the magnetic field sensor 50, sensor output 74, and uses that input, along with device input signals received at the bus interface 62 via input bus line 76 and bus line 78, which are connected to bus inputs SDA 80 and SCL 82, respectively, to produce coil driver signals 84a, 84b, 84c, 84d to be applied to the coil driver 52. Coil driver output signals are provided to outputs Out1 86 and Out2 88 on coil driver output lines 90 and 92, respectively. In addition to inputs 80, 82 and outputs 86, 88, the device 14a also has inputs or terminals to connect to external supply and ground, shown as a VDD terminal 94 and GND terminal 96. The coil driver 52 is coupled to the VDD terminal via a VDD line 98 and the GND terminal via a GND connection 100. Other sub-circuits of the device 14a are coupled to these VDD and GND terminals, as indicated in the figure.

The comparator circuit 70 is coupled to bridge output line 90 at a node "A" (node 102) by way of a comparator circuit input line 104. A comparator circuit output line 106 couples the comparator circuit 70 to control logic in the control circuitry 60. The calibration control circuit 72 is also connected to circuitry in the interface 54 by one or more calibration control lines 108.

Still referring to FIG. 2, the coil driver 52 is one that is particularly well-suited to linear motor drive and control of small linear motors such as voice coil motors, vibration motors, shutter triggers, polarization filters, speaker control, to give but a few examples. In this embodiment, the coil driver 52 is implemented as an H-bridge (or full bridge) circuit. This type of coil driver allows for bidirectional current flow, thus enabling a linear motor to operate in a forward and reverse direction. The first output 86 connects to one end of an external coil (coil 40a from FIG. 1) and the second output 88 connects to the other end of the external coil. In the illustrated embodiment, the H-bridge circuit 52 is constructed with four solid-state switches 110a, 110b, 110c, 110d (also labeled S1, S2, S3, S4, respectively, in the figure). When S1 and S4 are closed (and S2 and S3 are open) current flows through the coil 40a in one direction, from the first output 86 to the second output 88. Opening S1 and S4 and closing S2 and S3 causes current to flow through the coil 40a in the reverse direction, from second output 88 to first output 86.

The magnetic field sensor 50 may be implemented according to known techniques and designs. It will be understood that the sensor may contain various other circuits that operate collectively to generate a sensor output at output 74 from the magnetic field signals of the sensing device 56. For example, in addition to the amplifier 58 to amplify the magnetic field signals generated by the sensing device 56, the sensor 50 may be implemented to include other features, such as chopper stabilization, automatic gain control (AGC) and offset adjustment.

It will be understood that the sensing device 56 may be a Hall-effect sensing element or take a form other than that of a Hall-effect sensing element, such as a magnetoresistance (MR) sensing element. An MR sensing element may be made from any type of MR device, including, but not limited to: an anisotropic magnetoresistance (AMR) device; a giant magnetoresistance (GMR) device; a tunneling magnetoresistance (TMR) device; and a device made of a semiconductor material other than Silicon, such as Gallium-Arsenide (GaAs) or an Indium compound, e.g., Indium-Antimonide (InSb). The sensing element may include a single element or, alternatively, may include two or more elements arranged in various configurations, e.g., a half bridge or full (Wheatstone) bridge.

The device 14a may be provided in the form of an integrated circuit (IC) containing a semiconductor substrate on which the various circuit elements are formed. The IC would have at least one pin to correspond to each of: the VDD input or terminal 94, GND terminal 96, SDA input 80, SCL input 82, Out1 output 86 and Out2 output 88. It will be appreciated that the functionality of the IC, that is, the circuit elements contained within it, can be varied to suit a particular application.

Although a magnetic field sensor and coil driver are shown in FIG. 2, each slave device 14a, 14b may be a sensor without an integrated motor driver or a motor driver without an integrated sensor. For example, the slave devices may be sensors that perform the same sensing function or different sensing functions. Each identical sensor can be one that is suitable to detecting or measuring a particular physical parameter, such as movement/motion (e.g., in terms of position, proximity, displacement, speed, direction and derivatives thereof), light, pressure, stress/strain, temperature, and the like, as required by a desired application of the system 10. Any sensor construction, whether it be electromagnetic, optical, capacitive, resistive or piezoelectric, to give but a few examples, that is suitable for the type of sensing to be performed can be used as well. Other types of circuits may be used instead of or in addition to these types of circuits. Also, in addition to being a linear motor or actuator, as illustrated in the figures, the motor 28a (and motor 28b) may be a rotational motor, or alternatively, be replaced with some other type of machine or system (for example, those found in typical industrial, automotive or consumer applications).

Referring to back to FIG. 1, it will be appreciated that the figure is intended to depict only a functional partitioning of the system 10. If constructed as an IC, the device 14a (or device 14b) may be mounted or embedded in the magnet/coil assembly of the motor 28a (or motor 28b for device 14b). In one type of magnet/coil assembly, the magnet can move relative to a stationary coil. Another type of magnet/coil assembly could instead employ a stationary magnet and movable coil, or be replaced with some other mechanism capable of producing a change in magnetic field strength with change in position. The motor could be a rotational motor instead of a linear motor, as mentioned earlier. It will be appreciated that the depiction of the motor in FIG. 2 is intended to be only a simple representation. It will be understood that, in a basic motor construction, the motor would typically include a rotor and a stator. The rotor would include a multi-pole permanent magnet and the stator would include an assembly in which a coil and a motor control circuit connected to the coil are located. In the illustrated application, the motor control circuit is implemented as device 14a (or 14b).

During operation, the master device 12 initiates a communication (e.g., a command) directed to one of the slave devices 14a, 14b by sending a slave bus address over the SDA data line 18. In a motor control application like that depicted in FIGS. 1-2, that command may be a request for movement and indicate amount of movement needed (and direction if the design supports bidirectional movement). The interface 54 translates the request into the bridge driver signals 84a-84d to control the bridge 52. The bridge 52 produces a drive current signal, provided via one of the bridge output lines 90, 92, which is applied to an external coil. The coil, when energized, interacts with the magnet to cause the magnet's movement. The strength of the magnetic field generated by the magnet and coil is sensed by the sensor 50 as feedback relating the movement that actually occurred. The drive current signal can be adjusted until the movement matches that which was the requested by the controller 12.

Each slave device has its own unique bus address so that device can be selected by bus addressing alone (that is, without any additional hardware select or enable pins). If each identical device were to have an address that was entirely fixed at the time it was manufactured (as is the case for an integrated circuit or "IC"), it would not be possible to have two such devices residing on the same bus.

Figure 3:
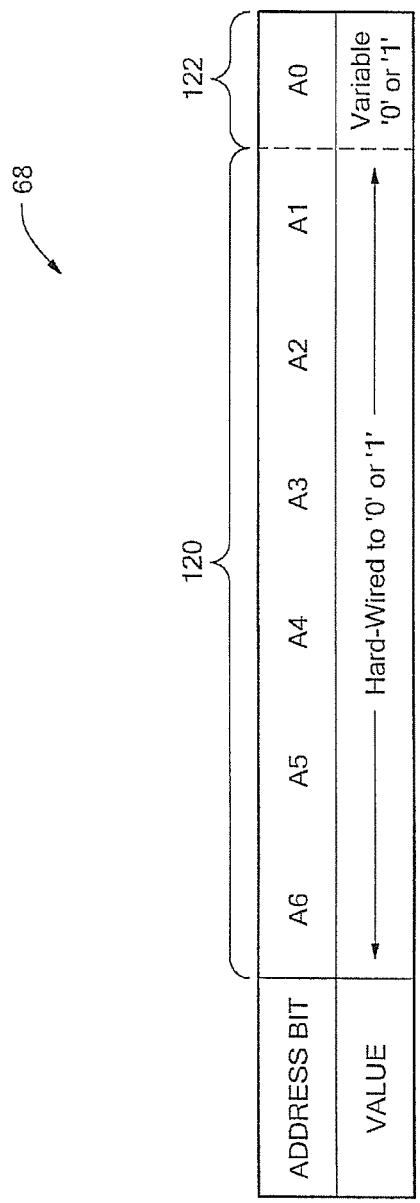
FIG. 3 shows an example format for the unique bus address, which is defined to have a fixed portion and a configurable portion (or sub-address)

FIG. 3 shows an example format for the bus address 68 (from FIG. 2). The bus address 68 includes a base portion 120 and variable (or configurable) portion 122. The base portion 120 is fixed in the device 14a at the time of manufacture. Each bit in the base portion 120 is tied to VDD or GND (i.e., hard-wired to '1' or '0', respectively) according to a predetermined bit definition for the base portion of the bus address. The variable portion 122 is set by the device 14a based on the state of the output Out1 86 (shown in FIG. 2) during a predetermined time interval when the devices outputs are in high impedance, for example, during power-up. In the illustrated example, the bus address 68 is a 7-bit address of address bits A0 through A6, with A0 being the least significant bit and A6 being the most significant bit. In the 7-bit address, six bits, A1 to A6, correspond to the fixed base portion 120 and a single bit, shown as the least significant bit A0, corresponds to the variable portion 122. The variable portion may be implemented to include more than one bit, as will be discussed later.

Thus, to allow identical devices 14a, 14b to reside on bus 16 (shown in FIG. 1), each device uses an address that is a combination of bits that are fixed (or "hard-wired") in the device's internal circuitry and at least one bit that is configured or set by the device during power up. The configurable (or variable) bit can be set high or low to make each device's bus address a unique address that doesn't conflict with that of the other device (or devices, if more than one) on the bus.

The variable bit (or bits) may be referred to as a device identifier (or ID) or sub-address. As discussed above, the base portion 120 and configurable portion 122 of the bus address 68 are provided in the storage device 66 of the bus interface 62 in the control unit 54. The storage device may be single device (such as a register or other storage element, e.g., a non-volatile memory element like an EEPROM, as mentioned earlier), or may represent more than one type of circuit or device, e.g., a first type to provide the fixed bits and a second type that is suited to storing variable information, such as flip flops as storage cells. The state of a variable bit in the configurable portion 122 is set based on whether the device's corresponding output 86 is coupled to VDD via an external resistor (i.e., resistor 48 of FIG. 1). Once all bits of the slave device bus address are set, the slave device 14a, 14b operates during bus accesses in the same way it would if it were pre-programmed with the full bus address, i.e., decoder logic in the bus interface 62 would compare the slave device's bus address received over the bus 16 from the master 12 to the bus address 68 stored on the device 14a, 14b (e.g., in a storage device such as storage device 66 in the bus interface 62, as shown in FIG. 2).

A customer or user of the device 14a, 14b would be given the base portion 120 of the bus address 68 (or "base address") and would implement software within the master 12 to define each device 14a, 14b as having the base address plus '0' (or '1'). That is, the master 12 would be programmed to address one of the devices 14a, 14b by the base address plus '0' and the other device by the base address plus '1'. The device with its bus address's variable portion 122 set to '1' would be the device having an external pull-up, such as resistor 48, connected to its output 86. In the system example of FIG. 1, that device happens to be device 14b.

Figure 4:
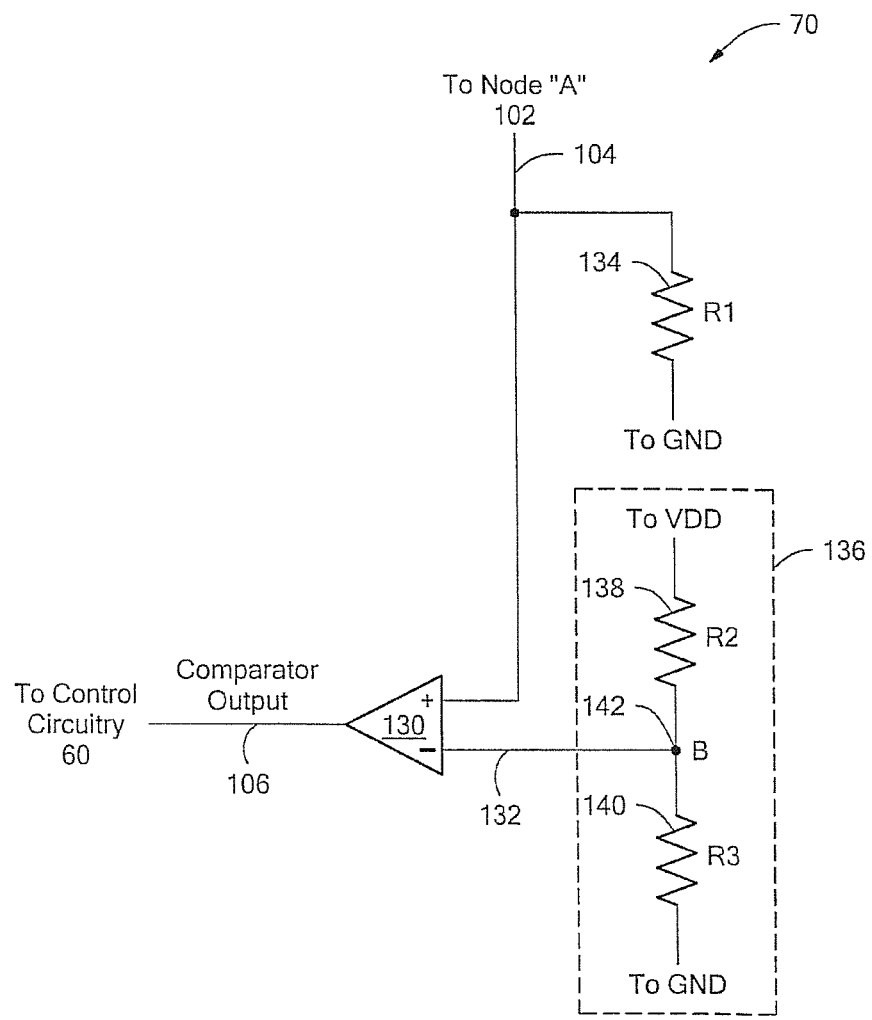
FIG. 4 is a schematic diagram of the comparator circuit (shown in FIG. 2) according to an exemplary embodiment.

Referring to FIG. 4, the details of the comparator circuit 70 are shown. The circuit 70 is coupled between node "A" 102 and the control circuitry 60 from FIG. 2. The circuit 70 includes a comparator 130 having a first comparator input corresponding to line 104 (that is connected to node A 102) and a second comparator input 132. The comparator 130 has a comparator output corresponding to comparator output line 106. The comparator output line 106 is connected to the control circuitry 60. Coupled between node A 104 and GND is a first resistor ("R1") 134. The second comparator input 132 is connected to a voltage divider circuit 136. The voltage divider circuit 136 includes a second resistor ("R2") 138 and a third resistor ("R3") 140, which are coupled to each other between VDD and GND to form a voltage divider that provides a voltage at a node "B" 142. The voltage at node B 142 is a first predetermined ratio, R3/(R2+R3), of VDD. It is used as a threshold-based reference voltage ("threshold voltage") at the second comparator input 132.

Figure 5:
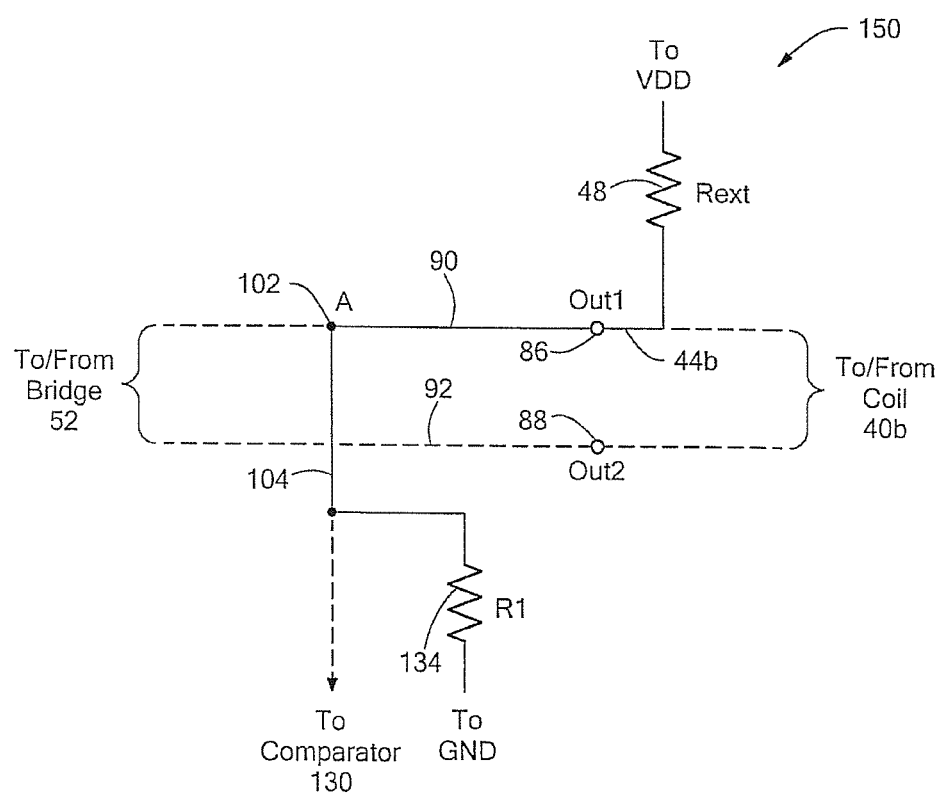
FIG. 5 is a schematic diagram of an exemplary voltage divider circuit formed at the output of the slave device when the output is coupled to an external pull-up resistor.

Referring to FIG. 5, a second voltage divider circuit shown as voltage divider circuit 150 is shown. At the node "A" 102, the same output (Out1) 86 that is coupled to the external resistor 48 is tied to ground through the resistor R1 134. The connection of the external resistor 48 and the internal resistor R1 134 forms a voltage divider that produces a voltage at node A 102 that is a second predetermined ratio, R1/(Rext+R1), of VDD.

Referring now to FIG. 4 in conjunction with FIG. 5, the comparator 130 receives at its first and second inputs the voltage value at node A 102 and the threshold voltage at node B 142. In the illustrated implementation of FIG. 4, the threshold voltage is set by the voltage divider circuit 136. The comparator 130 monitors the voltage value at node A 102 during a predetermined interval, e.g., during power-up. When the voltage value at node A 102 is greater than the value of the threshold voltage at node B 142, the comparator output 106 provides a first logic level (e.g., a '1'), indicating the presence of the external resistor 48. Otherwise, the comparator output 106 provides a second logic level (e.g., a '0'), indicating that an external resistor is not connected at the device's Out1 output 86.

If the second voltage divider circuit 150 (formed by the external resistor 48 and internal resistor R1 134) is designed to set the node voltage at node A 102 to a first value, e.g., VDD/2, then the voltage divider circuit 136 can be designed to set the node voltage at node B 142 (the comparator's threshold voltage) to a second value that is less than the first value, preferably half of the first value. Thus, if the node voltage at node A 102 is set to a value of VDD/2, then the node voltage at node B 142 could be set to a value of VDD/4, for example. High valued resistors, e.g., 200 K ohms, should be chosen for resistors 48 and 134 of the voltage divider circuit 150.

Figure 6A:
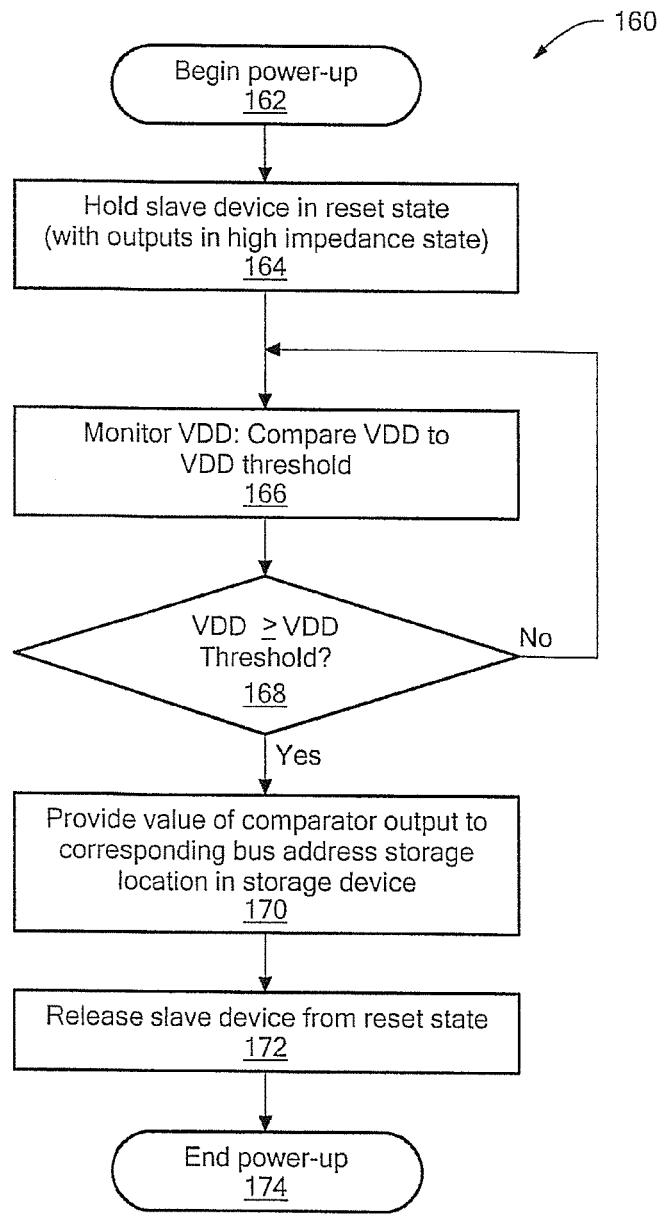
FIG. 6A is a flow diagram illustrating an exemplary power-up sequence, which includes configuration of the configurable portion of the unique bus address.

Referring to FIG. 6A, a power-up sequence 160 (performed by the control circuitry 60 from FIG. 2) that configures the configurable portion 122 of the bus address 68 (from FIG. 3) is shown. It begins with the initiation of power-up when the supply voltage VDD is applied to the slave device (block 162). When power-up occurs, internal circuits of the device are held in a reset state, with the device's outputs Out1 86 and Out2 88 (shown in FIG. 2) in a high impedance state, i.e., disabled (block 164). More specifically, all of the switches 110a-110d are open so that the bridge 52 (also shown in FIG. 2) is disabled and the outputs are left "floating". The circuitry 60 monitors the ramp up of the supply voltage VDD on the internal VDD bus by comparing the value of VDD on that bus to a VDD threshold (block 166). The VDD threshold is the voltage level sufficient for normal device operation. It will be appreciated that a timer-based mechanism to measure a power-up rise time could be used instead of a threshold-based mechanism. If it is determined that VDD has reached the VDD threshold, that is, is greater than or equal to (">") the VDD threshold (at block 168), the value of the comparator output 106 is stored in (or provided to) an appropriate location of the storage device 68, that is, the location that corresponds to the variable portion 122 of the device's bus address 68 (block 170). The control circuitry 60 releases the device from reset (at block 172) and terminates the power-up sequence (block 174). It will be understood that other activities may occur as part of the power-up sequence as well.

Figure 6B:
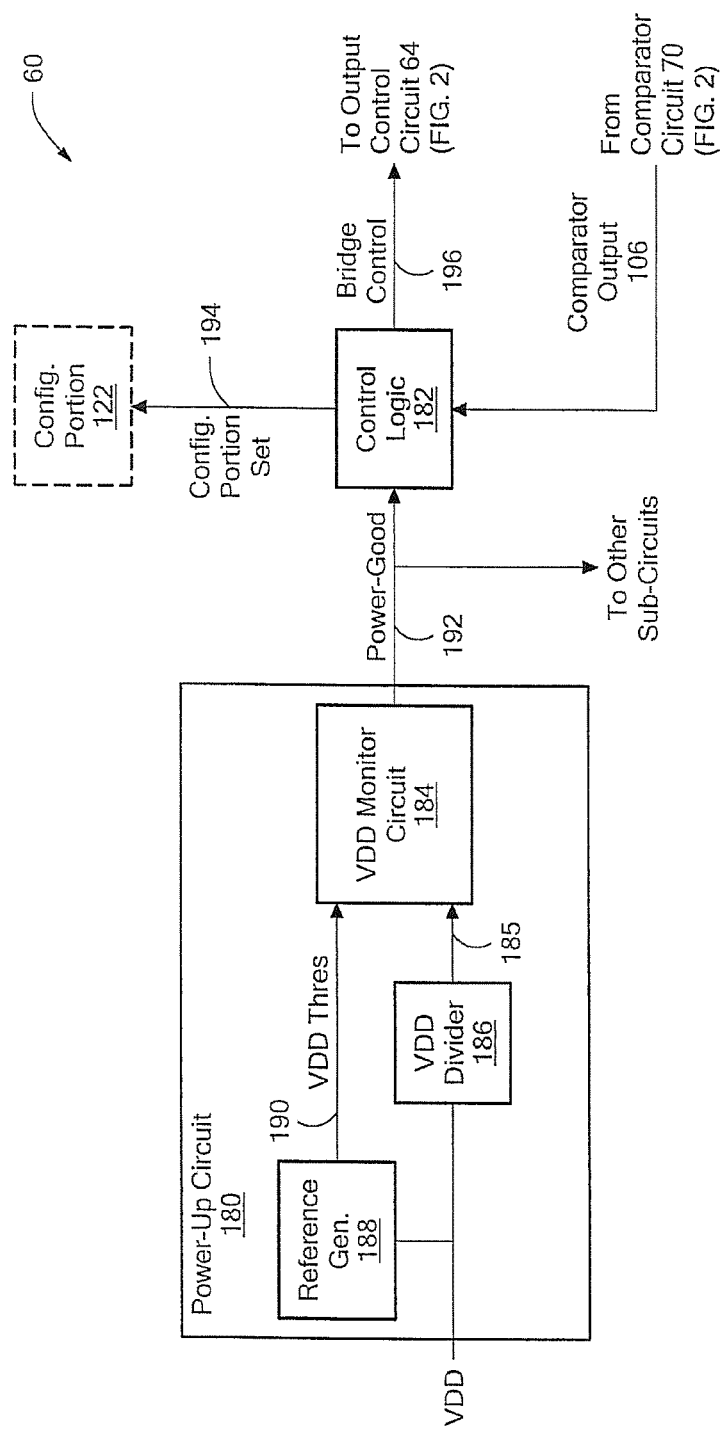
FIG. 6B is a block diagram of exemplary control circuitry used to perform the power-up sequence illustrated in FIG. 6A.

FIG. 6B shows an exemplary embodiment of the control circuitry 60 (from FIG. 2) used to perform the power-up sequence illustrated in FIG. 6A. Included in the circuitry 60 is a power-up circuit 180 and control logic 182. The power-up circuit 180 includes a VDD monitor circuit 184 that determines when VDD has reached a predetermined VDD threshold. In one implementation, circuit 184 can receive as an input 185 a signal that may be VDD or a signal produced by a voltage divider 186 to follow VDD with a predetermined reduction factor (i.e., a divided down VDD). Depending on the implementation of the circuit 184, the circuit 184 may also receive a reference voltage generated by a reference generator 188 to use as the VDD threshold ("VDDThres 190"). The power-up circuit 180 provides a control signal 192 (labeled "Power-Good") to the control logic 182 as well as other sub-circuits (including the output control circuit 64 (from FIG. 2). At the beginning of power-up, the control signal 192 is at a first logic level corresponding to an initially assumed state (such as reset, as illustrated in FIG. 6A, block 164, which causes the outputs to be disabled, i.e., held in a high impedance state) and then transitions to a second logic level corresponding to a second state when the value of VDD on input 185 reaches a predetermined threshold voltage. The VDD monitor circuit 184 may be implemented in a number of different ways, e.g., as a type of compare circuit to compare inputs 185 and 190, or as a current subtractor circuit that requires only input 185. More generally, the power-up circuit 180 may be implemented according to any number of known techniques, for example, using conventional power-on reset (POR) circuit techniques.

Still referring to FIG. 6B, after line 192 indicates to the control logic 182 that VDD has reached a sufficient level for normal device operation, the control logic 182 provides to the configurable portion 122 of the bus address (via configuration portion set signal 194) the '0' or '1' value it 'sees' at the comparator output 106. Subsequent to setting the configurable portion 122, the control logic 182 provides the appropriate control signal (or signals) to allow proper initialization and/or configuration of other portions of the device, for example, signaling to the output control circuit 64 (via bridge control 196) to set the bridge and its outputs, that is, outputs 86, 88 (from FIG. 2) for normal operation.

As mentioned earlier, the bus address configuration can occur during any predetermined time interval. It need not occur as part of a power-up sequence, as was illustrated in and described above with reference to FIGS. 6A-6B. It could instead occur during a different predetermined time interval, such as a predetermined time interval defined by a clock signal, when the outputs are not used and the bus address is not yet required. An application may not require that the device's bus address be available immediately after power-up has been completed, for example, if the controller 12 (from FIG. 1) is not ready to begin communicating with the slave devices, or is otherwise busy or unavailable. In such a scenario, a "slow" clock signal, that is, a clock signal having a short or low duty cycle (that is, having a duty cycle of less than 50%) and/or low clock rate (one that is lower than the normal clock rate at which the device operates, e.g., in a range of approximately 100 mHz to 100 Hz, or even lower) can be used to enable the bus address configuration activities to occur while the outputs are disabled.

Figure 6C:
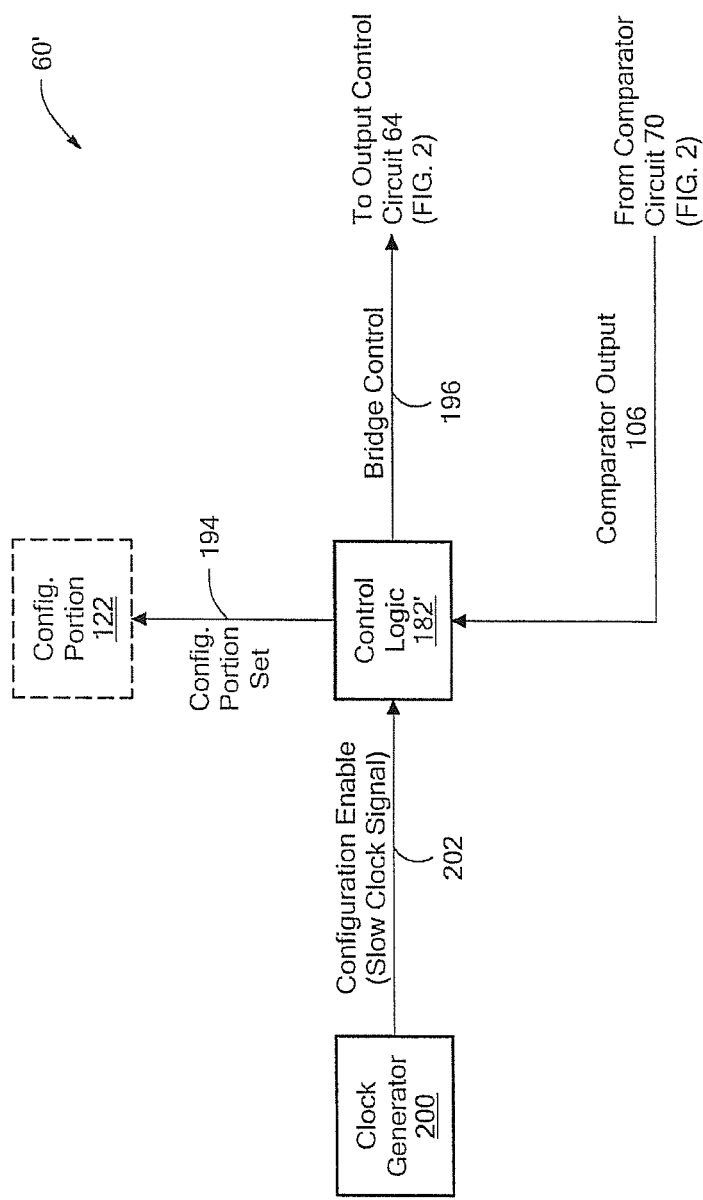
FIG. 6C is a block diagram of alternative exemplary control circuitry used to perform configuration of the configurable portion of the unique bus address.

Turning now to FIG. 6C, in an alternative embodiment of the control circuitry 60 from FIG. 2, the control circuitry 60 may be implemented to use a clock signal generated by a clock generator to enable bus address configuration. This alternative embodiment of the control circuitry 60, shown in FIG. 6C as control circuitry 60', includes a clock generator 200 and control logic 182'. The clock generator 200 provides a "slow" clock signal 202 to the control logic 182'. The clock generator 200 may be a slow clock generator that provides the slow clock signal 202 to the control logic 182' or a clock generator that generates a clock signal at the normal, higher clock rate as well as the slow clock signal 202 (e.g., the clock generator 200 may produce the slow clock from the normal faster clock) and provides the slow clock 202 to the control logic 182'. If the clock generator 202 is a dedicated slow clock generator, the other clock signal or signals would be generated elsewhere. For the control logic 182' the clock signal 202 serves as a configuration enable. The control logic 182' responds to the clock signal 202 by performing configuration activities described earlier with respect to control logic 182 shown in FIG. 6B. That is, the control logic 182' obtains the comparator output 106 and provides the value to the configurable portion 122 via configuration portion set signal 194. Thus, the clock signal 202 is used instead of the "Power-Good" signal 192 shown in FIG. 6B to enable the control logic 182' to acquire the unique sub-address indicated at the comparator output 106. Although not shown, the clock signal 202 may be a gated clock signal that is provided to the control logic 182' only if the "Power-Good" signal 192 indicates a power-on VDD threshold has been reached. This additional clock control requires gating logic such as a AND gate, to which both signals 192, 202 are provided as inputs.

In one implementation, the clock logic 182' is an edge-triggered control circuit and responds to a rising or falling transition of the clock signal 202. That edge-based transition commences a time interval during which the control logic 182' performs its activities, including the bus address configuration as well as control of the bridge and bridge outputs (via the output control circuit 64, shown in FIG. 2) so that the bridge and the bridge outputs are disabled while the bus address configuration occurs. In another possible implementation, the clock signal 202 may be a short duty cycle clock signal and the clock logic 182' may be controlled by the duty cycle of the clock signal. In this second implementation, the control logic 182' begins its activities when the clock signal 202 goes to a first logic level (e.g., a high level) and ends those activities when the clock signal 202 goes to a second logic level (e.g., a low level). Thus, the duty cycle of the clock signal 202 may be used to define the duration of the predetermined time interval in which the bus address configuration occurs. Although not shown, it will be appreciated that the clock signal duty cycle can also be used to control the bridge and bridge outputs so that the bridge and bridge outputs are disabled for the bus address configuration and subsequently restored to operational condition. When the bridge outputs are disabled, that is, in high impedance, an output that is connected to the comparator circuit 70 (from FIG. 2), like output 86, will settle to GND or to a predetermined ratio of VDD depending whether it is coupled to the external resistor Rext 48 (shown in FIGS. 1 and 5).

Other predetermined time intervals, whether initiated internally, as those described above, or externally, for example, via a control pin on the device, are contemplated as well. For example, an internally or externally initiated reset operation could be used to enable the bus address configuration in much the same manner as the power-up and clock-based techniques discussed above.

The motor driver slave device 14a, 14b, with the features as described above, may be used in a variety of applications. One example is an image stabilizer, which is typically found in high resolution cameras like digital still cameras or mobile phones (i.e., camera phones). An image stabilizer may use a device such as a gyroscope to detect movement (in particular, camera movement due to hand shake). The controller uses the detected movement to take appropriate corrective action via the actuating mechanism of the motor.

Figure 7:
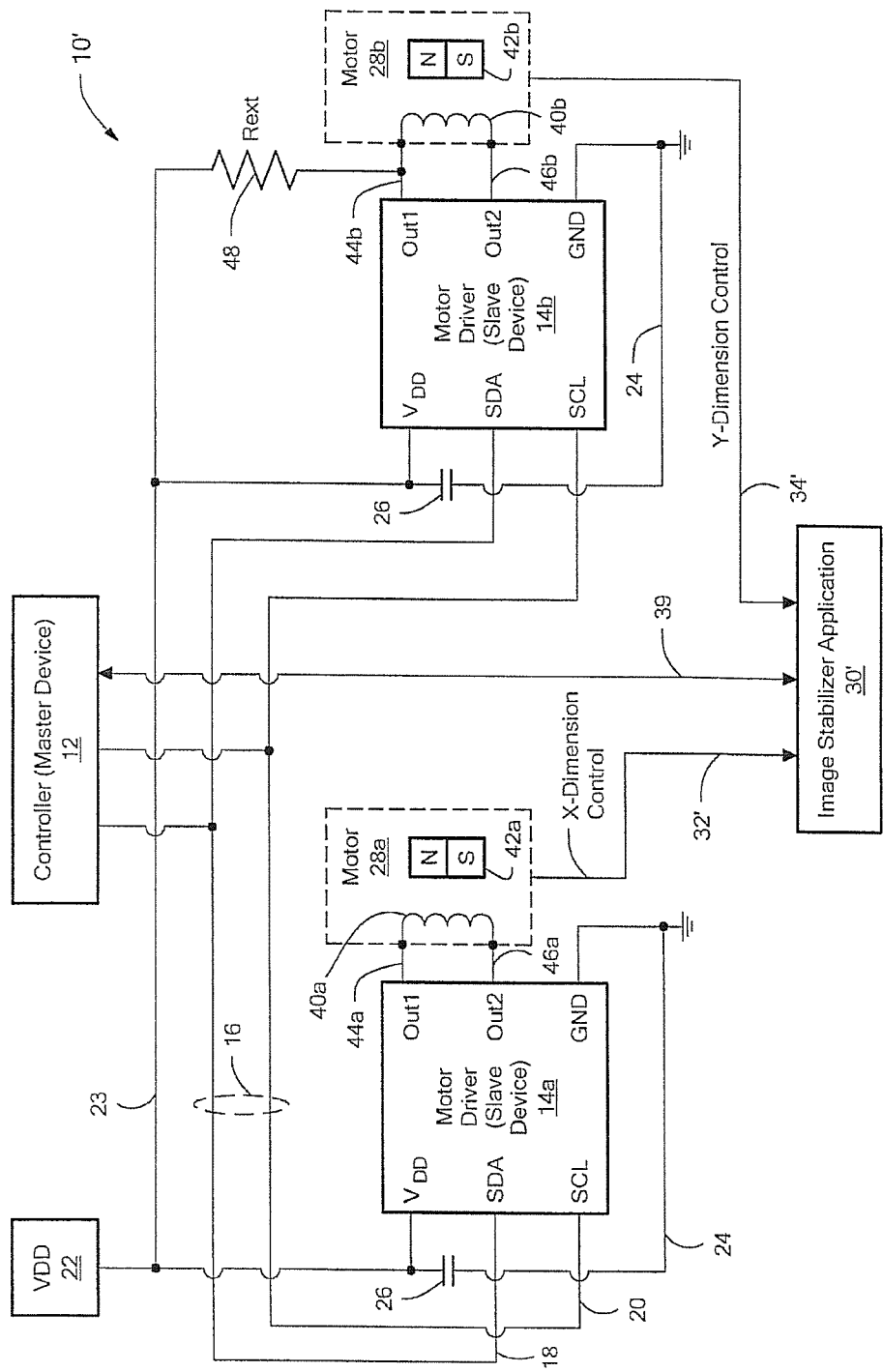
FIG. 7 is a block diagram of a system that employs the two motor drivers (from FIG. 1) to control an image stabilizer application.

FIG. 7 shows a system 10' that is the same as system 10 in FIG. 1 except that the application 30 from FIG. 1 is shown here as an image stabilizer application 30' and each motor provides a different linear movement control (indicated by lines 32', 34') to the application 30'. More specifically, the image stabilizer has an optical assembly (not shown) and the motors 28a, 28b control the linear movement of a lens of the optical assembly to adjust the lens position. The motor drivers 14a, 14b control their respective motors 28a, 28b.

The controller 12, based on detected movement, determines the compensation necessary in two dimensions (or axes) of movement, e.g., the 'x' and 'y' dimensions, and sends the appropriate command to the appropriate motor driver. That particular device drives the coil/magnet assembly to provide the requested compensation movement.

Each device 14a, 14b controls movement in one dimension, such as 'x' or 'y'. In the example shown, motor driver 14a provides an output signal via output line 44a (or 46a) that causes motor 28a to provide x-dimension movement control to the image stabilizer application 30 and motor driver 14b provides an output signal via output lines 44b (or 46b) that causes motor 28b to provide y-dimension movement control to the image stabilizer application 30'.

In a full bridge motor driver application in which the two output pins are connected to a relatively low resistance coil, like the one depicted in FIG. 1 or FIG. 7, the output pins are essentially shorted together. Such an application, in which the outputs are, in effect, tied together, can use one or the other of the outputs to uniquely identify two identical devices. With a single output, half bridge driver in each device, only two devices can be uniquely identified as well. In general, however, if there are N independent outputs, then $2^N$ is the number of unique sub-addresses that can be supported and N corresponds to the number of bits in the sub-address 122 (from FIG. 3), as illustrated in FIG. 8.

Figure 8:
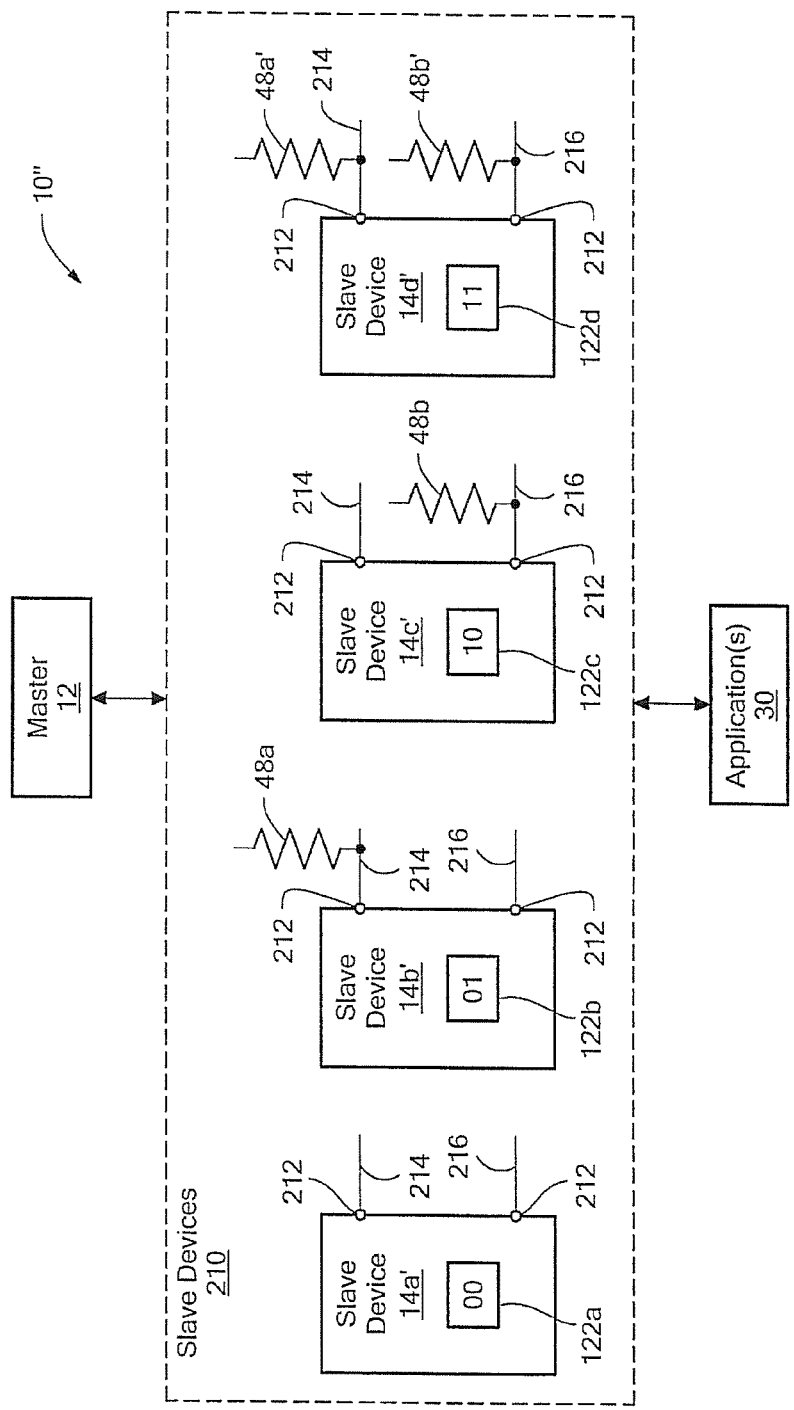
FIG. 8 is block diagram showing a system with four identical slave devices configured with four respective sub-addresses.

FIG. 8 shows a system 10" in which a group of identical slave devices 14a', 14b', 14c', 14d' (indicated collectively as slave devices 210), are coupled to the master 12 and application(s) 30. The slave devices 14a', 14b', 14c', 14d' are configured with respective sub-addresses 122a, 122b, 122c, 122d. Each slave device has two independent outputs shown as outputs 212. Thus, one, both or none of the connections to those outputs may be coupled to an external resistor (like resistor 48, from FIG. 1), shown here as external resistor 48a (or 48a') at one output and external resistor 48b (or 48b') at the other output, in order to configure the device with the appropriate sub-address. Internally, slave devices 14a'-14d' are the same as slave device 14a shown in FIG. 2 except that both outputs 212, like output 86 in FIG. 2, are monitored by a comparator circuit like comparator circuit 70 (shown in FIG. 2). Thus, each slave device 14a'-14d' has two comparator circuits like comparator circuit 70, each comparator circuit coupled between a respective one of the two outputs 212 and the control circuitry 60 (FIG. 2). The output connections or lines are shown here as output connections 214, 216 for each slave device 14a', 14b', 14c', 14d'. Device 14a' has no external resistors connected to its outputs via output connections 214, 216, so the address configuration circuitry and logic will configure its sub-address 122a to '00'. Device 14b' has one of its outputs connected (at output connection 214) to an external resistor, external resistor 48a, so its sub-address 122b will be configured as '01'. Device 14c' has the other of its outputs connected (at output connection 216) to an external resistor, external resistor 48b, so its sub-address 122c will be set to '10'. Device 14d' has both of its outputs connected to external resistors, external resistors 48a', 48b', at output connections 214, 216, respectively. Consequently, its sub-address 122d will be set to '11'. This example assumes that one particular output corresponds to the LSB in the sub-address, but the other output could be selected to correspond to the LSB instead.

The bus address configuration technique described herein may be applicable to any slave device having an output that is placed in a high impedance state during a predetermined time interval. All that is required is an external component such as a pull-up resistor like resistor 48 coupled to at least one output of at least one of the slave devices residing on a serial bus and internal circuitry in each device that can use the state of each independent output during that predetermined interval to uniquely identify that device. It could be any type of device to be controlled by a master device such as a processor or controller, including any one of the variety of special function integrated circuits that are already provided with I²C interfaces, e.g., memory chips, analog-to-digital converters, digital-to-analog converters and real-time-clocks.

The serial bus (e.g., the serial bus shown as serial bus 16 in FIGS. 1 and 7) can be any serial bus that involves a bus "master" that identifies a bus "slave" device attached to the bus using a bus address that is transmitted over the bus. Thus, the unique bus address configuration technique may be applicable to other serial bus technologies besides I²C.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A device for use as a slave device in a system having a master device and at least one slave device coupled to a serial bus comprising:
   an interface, to connect to a serial bus to receive a communication from a master device over the serial bus and generate signals in response thereto, the interface comprising a storage device to provide a bus address by which the master device addresses the device, wherein the bus address has a fixed base portion and a configurable portion;
   an output at which an output signal of the device is provided in response to the interface generated signals;
   a comparator circuit, coupled to the output, to determine a state of the output and having a comparator circuit output at which the state of the output is provided; and
   control circuitry, coupled between the storage device and the comparator circuit output, to use the state provided at the comparator circuit output to configure the configurable portion as a unique identifier for the device.

2. The device of claim 1 wherein the comparator circuit output provides the state at a first logic level when the output is connected to an external pull-up resistor and at a second logic level when the output is not connected to an external pull-up resistor.

3. The device of claim 2 wherein the comparator circuit comprises a comparator having a first input, coupled to the output of the device, to receive a first voltage defined as a first predetermined ratio of a supply voltage when the output is connected to the external pull-up resistor and a second input to receive a second voltage corresponding to a predetermined threshold voltage.

4. The device of claim 3 wherein the comparator is operable to compare the first and second voltages, and provide the first logic level as the state of the output at the comparator circuit output when the first voltage is greater than the second voltage.

5. The device of claim 3 wherein the first voltage is provided at a node between a first pull-down resistor and the external pull-up resistor when the output is connected to such external pull-up resistor.

6. The device of claim 3 wherein the second voltage is defined as a second predetermined ratio of the supply voltage.

7. The device of claim 6 wherein the second predetermined ratio of the supply voltage is less than the first predetermined ratio of the supply voltage.

8. The device of claim 2 wherein the control circuitry is operable to determine the state provided at the comparator circuit output when a supply voltage threshold has been reached during a power-up sequence.

9. The device of claim 8 wherein the output is disabled during the power-up sequence.

10. The device of claim 1 wherein the control circuitry comprises a clock generator to generate a clock signal and control logic coupled to the clock generator, wherein the clock signal is usable to enable the control logic to determine the state provided at the comparator circuit output while the output is disabled.

11. The device of claim 1 further comprising a sensor, coupled to the interface, to detect movement of a motor controlled by the device and provide a sensor output signal to the interface based on the detected movement.

12. The device of claim 11 wherein the sensor comprises a magnetic field sensor.

13. The device of claim 11 further comprising a coil driver, coupled between the interface and the output, to drive a coil of an external motor.

14. The device of claim 1 further comprising a coil driver, coupled between the interface and the output, to drive a coil of an external motor.

15. The device of claim 1 wherein the device is configured to operate as an I²C slave device.

16. The device of claim 15 wherein the bus address is a seven-bit I²C bus address and the configurable portion comprises a least significant bit of the seven-bit I²C bus address.

17. A system having a master device and at least one slave device coupled to the serial bus comprising:
   a serial bus;
   a master device coupled to the serial bus; and
   at least one slave devices coupled to the serial bus, each comprising:
   an interface, to connect to the serial bus to receive a communication from the master device over the serial bus and generate signals in response thereto, the interface comprising a storage device to provide a bus address by which the master device addresses the slave device, wherein the bus address has a fixed base portion and a configurable portion;

at least one output at which an output signal of the at least one slave device is provided in response to the interface generated signals;

a comparator circuit, coupled to the at least one output, having a comparator circuit output at which a state of the at least one output is provided; and control circuitry, coupled between the storage device and the comparator circuit output, to use the state provided at the comparator circuit output to configure the configurable portion as a unique identifier for the at least one slave address.

18. The system of claim 17 wherein the comparator circuit output provides the state at a first logic level when the output is connected to an external pull-up resistor and at a second logic level when the output is not connected to an external pull-up resistor.

19. The system of claim 18 wherein the comparator circuit comprises a comparator having a first input, coupled to the output, to receive a first voltage defined as a first predetermined ratio of a supply voltage when the output is connected to the external pull-up resistor and a second input to receive a second voltage corresponding to a predetermined threshold voltage.

20. The system of claim 18 wherein the control circuitry is operable to determine the state provided at the comparator circuit output when a supply voltage threshold has been reached during a power-up sequence.

21. The system of claim 18 wherein the control circuitry comprises a clock generator to generate a clock signal and control logic coupled to the clock generator, wherein the clock signal is usable to enable the control logic to determine the state provided at the comparator circuit output while the output is disabled.

22. The system of claim 17 wherein each slave device comprises two or more slave devices, the at least one output in each of the two or more slave devices comprises N outputs and the configurable portion of the bus address for each of the two or more slave devices comprises N bits.

23. The system of claim 17 wherein the at least one slave device comprises two or more slave devices including a first motor driver and a second motor driver, the first motor driver coupled to and providing control for a first motor and the second motor driver coupled to and providing control for a second motor, and wherein the first motor driver is controlled by the master device to provide an output signal that causes the first motor to control movement of a structure in a first dimension and wherein the second motor driver is controlled by the master device to provide an output signal that causes the second motor to control movement of the structure in a second dimension.

24. A device for use as a motor driver slave device in a system having a master device and at least one motor driver slave device coupled to a serial bus comprising:

an interface to receive a communication from a master device, over a serial bus and generate signals based on the communication, the interface comprising control circuitry and a bus interface with bus inputs to connect to the serial bus, and the bus interface including a storage device to provide a bus address by which the master device addresses the device, the bus address having a fixed base portion and a configurable portion;

a coil driver, coupled to the interface, to generate a coil driver output signal in response to the interface generated signals;

an output at which the coil driver output signal is provided to drive a coil of an external motor;

a comparator circuit, coupled to the output, to determine a state of the output and having a comparator circuit output at which the state of the output is provided; and control circuitry, coupled between the storage device and the comparator circuit output, to use the state provided at the comparator circuit output to configure the configurable portion as a unique identifier for the device.

* * * * *

UNITED STATES PATENT AND TRADEMARK OFFICE
CERTIFICATE OF CORRECTION

| | | |
|---|---|---|
| PATENT NO. | : 8,461,782 B2 | Page 1 of 1 |
| APPLICATION NO. | : 12/548815 | |
| DATED | : June 11, 2013 | |
| INVENTOR(S) | : Michael G. Ward et al. | |

It is certified that error appears in the above-identified patent and that said Letters Patent is hereby corrected as shown below:

In the Claims

Col. 12 line 37, delete "claim 1" and replace with --claim 2--.

Signed and Sealed this
Second Day of June, 2015

Michelle K. Lee
*Director of the United States Patent and Trademark Office*